UNITED STATES PATENT OFFICE.

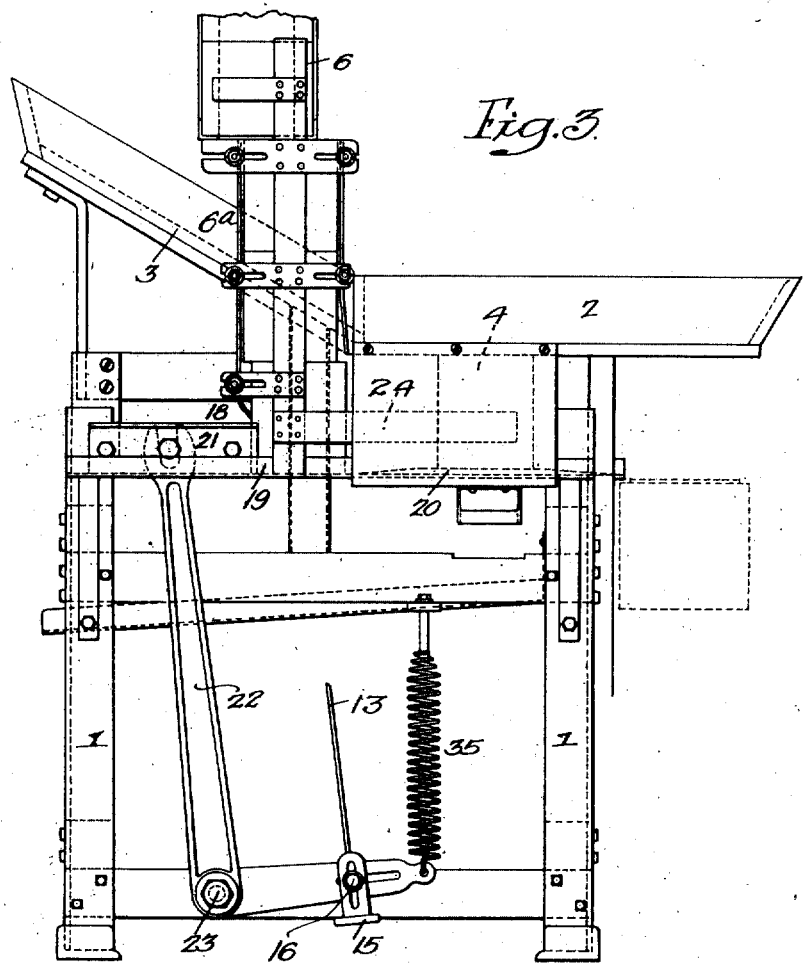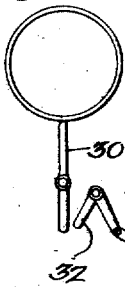

FRANK P. SOUDER, OF BRIDGETON, NEW JERSEY.

CAN-FILLING MACHINE.

1,243,566.  Specification of Letters Patent.  Patented Oct. 16, 1917.

Application filed February 21, 1914. Serial No. 820,297.

*To all whom it may concern:*

Be it known that I, FRANK P. SOUDER, a citizen of the United States, and a resident of Bridgeton, Cumberland county, New Jersey, have invented certain Improvements in Can-Filling Machines, of which the following is a specification.

My invention relates to can filling apparatus, and consists of improved means for bringing empty cans to a filling position and carrying the same away when filled; and is designed for employment in the filling of cans with solid or whole fruit or vegetables, more particularly tomatoes.

These and other features of my invention are more fully described hereinafter, reference being had to the accompanying drawings, in which:

Fig. 3, is a side elevation, and

Figs. 4, 5, 6, are views illustrating details of my invention.

Figure 1:
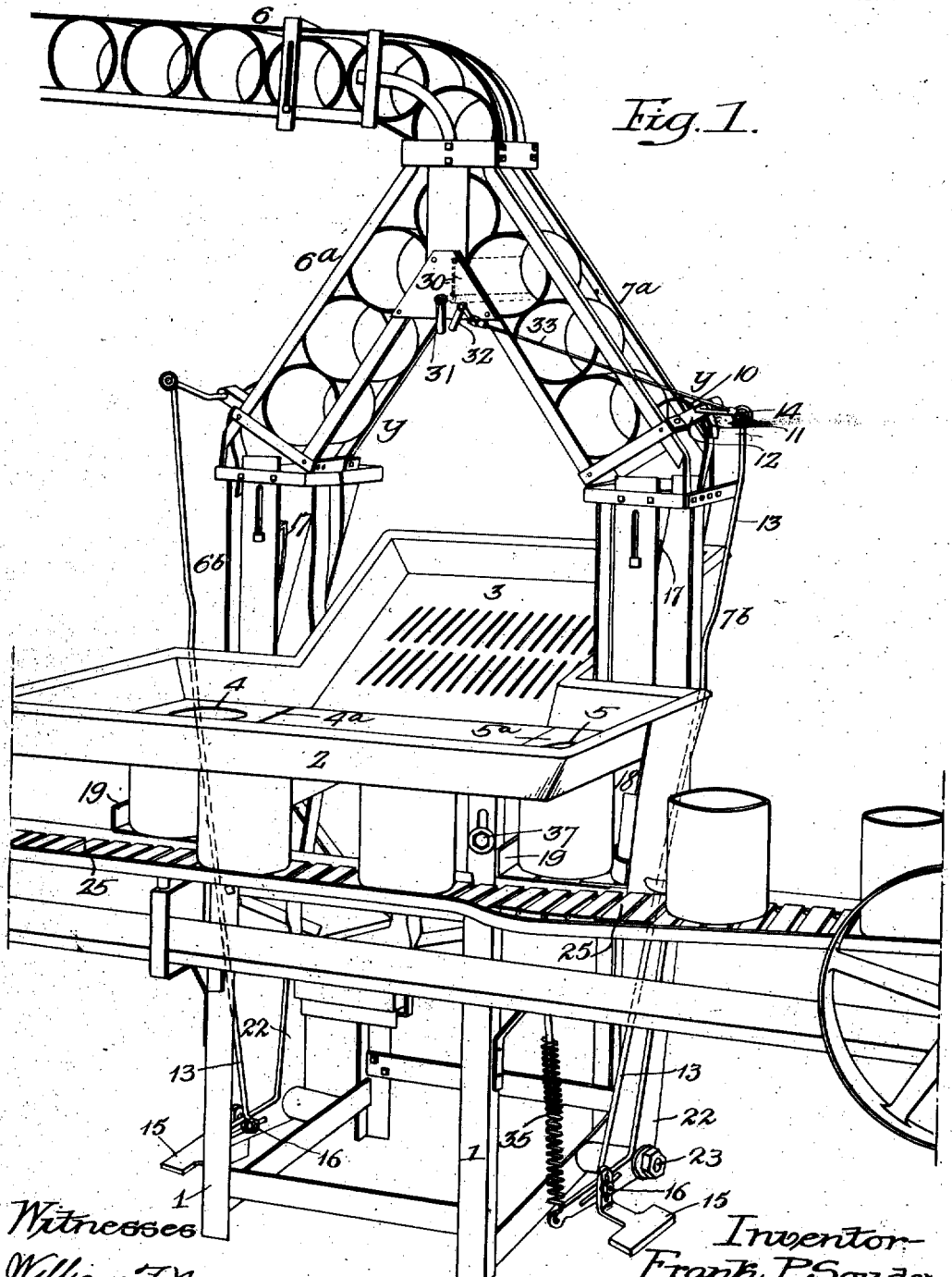
Figure 1, is a perspective view of the improved can filling apparatus embodying my invention.
Figure 2:
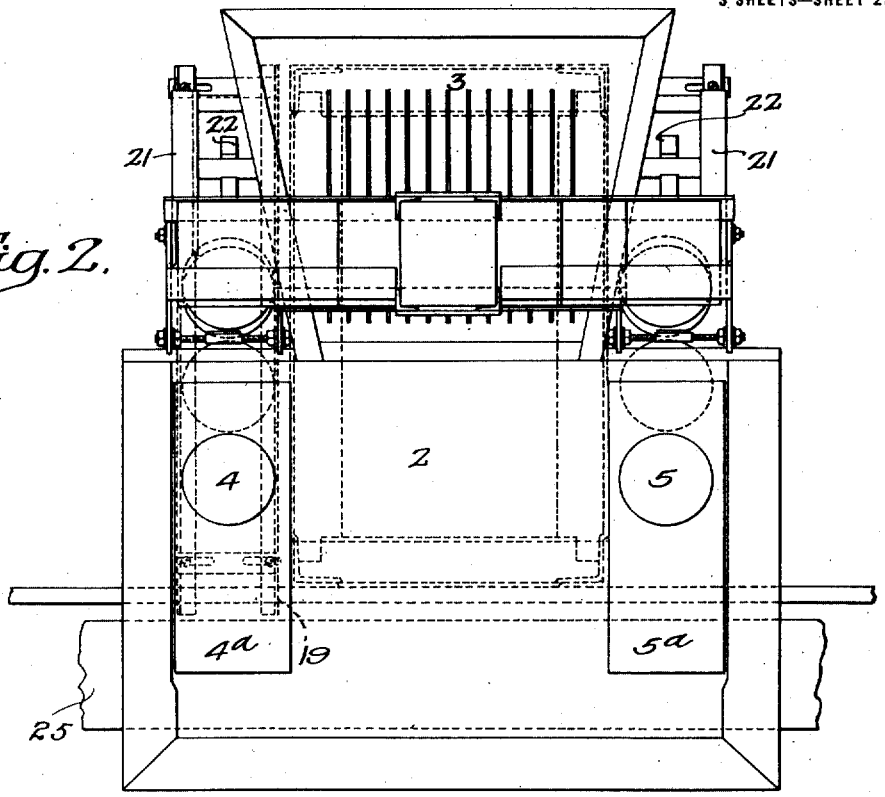
Fig. 2, is a plan view of the same.

In the use of my improved apparatus which includes means for handling the cans, the latter are hand-packed; that is to say, the fruit, vegetables or the like to be packed in a solid condition are placed in a suitable receptacle or hopper, where they may drain to the desired extent, and they are then placed by hand in the cans; the receptacle or hopper receiving the fruit or vegetables having a drain board, preferably inclined, and feed apertures or openings in the bottom of the same for the delivery of the fruit or vegetables to the cans.

In the drawings, 1 represents a suitable framework carrying a trough or pan 2, which may have an inclined draining bottom 3 upon which the tomatoes or other vegetables or fruit to be packed are placed. The bottom of this trough or receptacle is provided with filling openings 4 and 5, which may be at opposite ends of the same, beneath which cans may be centered for the reception of the fruit or vegetables to be packed therein. These filling openings are preferably formed in removable plates, $4^a$ and $5^a$, so that plates having openings of different size may be employed for the purpose of filling cans of different size.

The machine is duplex in character, and is treadle operated; a can being fed or moved into filling position for each movement of the treadle; the final movement of empty cans into filling position being timed and arranged to push the filled cans onto a suitable traveling belt or apron which serves to carry the cans to a heading machine, or to any suitable point.

The can delivery mechanism is mounted above the trough or pan 2, and comprises an open frame forming a channel or passageway 6 leading from a suitable source of supply (not shown) through which channel empty cans may be fed by suitable means, dropping by gravity to the points $y$, where they are temporarily held by suitable trigger-like devices. These devices, when operated, release one can while sustaining the succeeding can; which latter can is brought into the delivery position upon the resetting of the mechanism. This trigger mechanism is operated by foot treadles under the control of the operator, and the cans successively released on opposite sides of the machine pass from a central delivery point in communication with the channel or passageway 6 to one side or the other of the filling trough or pan, as the foot lever or treadle is operated to release the lowermost can on its respective side.

From the central point, the cans pass to channels $6^a$ and $7^a$, respectively; and should a can be temporarily held at the dividing point, a trip, hereinafter described, is arranged to engage a can and move it into one of the channels and thereby insure continuous feed of cans to the respective filling points. At a suitable point in said channels $6^a$ and $7^a$, the trigger releasing mechanism, before referred to, is located, comprising a spring arm 10, carried by a crank 11 pivotally mounted in a bracket 12; the outer end of said crank being connected to and operated by a rod 13 which is connected at its lower end to a treadle 15, pivoted at 16 below the machine and under the control of the foot of the operator.

The cans, it will be noted, are delivered on their sides in a position at right angles to the filling position, and before they are brought to the filling position, it is necessary to turn the same. This is accomplished in the following manner: As the cans leave the triggers 10, they drop into extensions 6ᵇ and 7ᵇ of the channels 6ᵃ and 7ᵃ, and striking against an adjustable projection 17 with said channels they are turned; falling back upon an inclined rear wall, they drop right side up and pass to a guideway 18, from which they are brought to the filling position beneath one of the filling openings 4 or 5. This guideway is of such a character that it not only supports the cans during their movement, but serves to position the same directly beneath the filling outlets; being provided with adjustable guiding bars 19 for laterally positioning the cans, and with a bottom support 20 which may be adjustable or replaceable with supports of different heights so that when a can is in the filling position there will be no gap between the under side of the filling trough and the top of the can.

Figure 4:
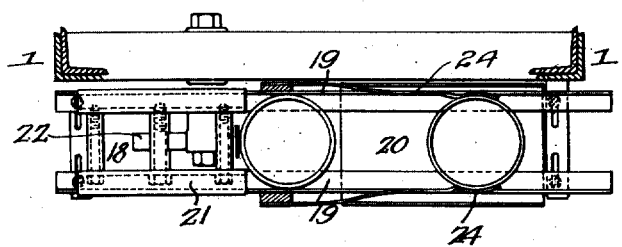
Figure 5:
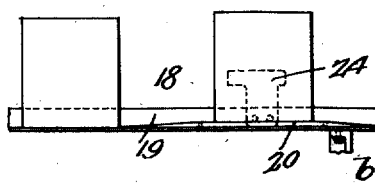

At the rear of the carrier frame, I provide a positioning member 21, which may be operated by an arm 22 pivoted at 16 on the same axis as the treadle 15 and connected thereto, so that movement imparted to the latter not only releases the trigger device 10, but simultaneously moves forward one of the previously righted cans in the guideway into the filling position. The guideway is provided with the raised portion 20 as described, and the range of movement of the arm 22 moving the bar 21 is such as to position a can directly beneath one of the filling openings for each operation of the treadle. Preferably the can is retained at this point by suitable tension means such as the spring fingers 24, shown in Figs. 4 and 5. Further movement of the positioning bar 21 to bring another empty can into place, pushes the full can onto a traveling belt 25 which serves to convey the cans to a suitable point where they may be headed in any usual or well known manner or otherwise taken care of; the particular can employed being that familiarly known as a "Sanitary" can, receiving a special and well-known top.

In the delivery of the cans, an agitating or tripping device is employed at the diverging point where the cans pass from the channel 6 to the channels 6ᵃ and 7ᵃ at opposite sides of the machine, and this mechanism may comprise a pivoted arm or finger 30 set at the point of the diverging channels; the upper relatively sharp edge of which may form a movable seat for a can which fails to pass directly into one of the channels 6ᵃ or 7ᵃ. This arm or finger 30 may also be operated from one of the treadles 15 by a suitable connection therewith; the arm or finger 30 being pivoted at 31 and having an external arm 32 which is connected with the rod 13 and crank arm 11 by the link 33.

The machine is preferably tended by two operators, each filling through one of the openings 4 or 5. Covers may be provided for one of the openings so that one side only, may be operated at a time by one attendant, and plates such as indicated at 4ᵃ and 5ᵃ, having different sized holes, are provided for different sized cans.

The treadles 15 and the arms 22 are retracted by springs 35 so that after each operation the machine is ready to deliver cans as long as they are supplied through the several channels.

The trough or pan 2 receiving the fruit and from which the latter is delivered to the cans is adjustably mounted on the frame 1; being held by bolts 37, for instance, so that it may be raised and lowered if necessary to make adjustments when cans of different height are employed.

I claim:

1. A can filling apparatus comprising a pan having a discharge aperture at the end of the same; a horizontal can channel below said pan and alined with said aperture; a vertical channel back of the pan and connecting with the rear end of the horizontal channel, and arranged to deliver cans thereto; a projection in the lower portion of one side of said vertical channel upon which one end of substantially horizontal cans may strike whereby the cans will be turned into upright position and delivered to the horizontal channel, and a pusher operating across the bottom of said vertical channel and over the horizontal channel for shifting the cans beneath the pan.

2. A can filling apparatus comprising a pan having a discharge aperture at the end of the same; a horizontal can channel below said pan and alined with said aperture; a vertical channel back of the pan and connecting with the rear end of the horizontal channel, and arranged to deliver cans thereto; a projection in the lower portion of one side of said vertical channel upon which one end of substantially horizontal cans may strike whereby the cans will be turned into upright position and delivered to the horizontal channel; a pusher operating across the bottom of said vertical channel and over the horizontal channel for shifting the cans beneath the pan, and means for maintaining individual cans in said horizontal channel in registry with the aperture of the pan; means for operating said pusher to advance the cans, and means for automatically retracting said pusher to engage succeeding cans.

3. In a can filling appartus, the combination with a pan or trough having a discharge aperture at the end of the same, of a substantially horizontal can channel below said receiving trough and alined with said aperture, means for delivering cans in upright position to said horizontal channel, a slidable member for shifting cans in said horizontal channel, frictional positioning means for maintaining individual cans in registry with the aperture of the pan or trough, an elevated filler support for raising said cans to the bottom of the pan or
5 trough, means for operating said slidable member, and means for retracting the latter for engagement with succeeding cans.

In testimony whereof, I have signed my name to this specification, in the presence of two subscribing witnesses.

FRANK P. SOUDER.

Witnesses:
MURRAY C. BOYER,
JOS. H. KLEIN.